3,480,599
UNSATURATED INTERPOLYMERS OF LINEAR ALIPHATIC HEPTADIENES AND/OR HEPTATRIENES AND ALPHA-OLEFINS
John C. Park, Cuyahoga Falls, Ohio, assignor to The B. F. Goodrich Company, New York, N.Y., a corporation of New York
No Drawing. Filed Sept. 28, 1965, Ser. No. 491,012
Int. Cl. C08f 15/40
U.S. Cl. 260—80.7        6 Claims

ABSTRACT OF THE DISCLOSURE

Sulfur-vulcanizable interpolymers of one or more alpha-olefins such as ethylene and propylene interpolymerized with 4-ethylidene-1,6-heptadiene and/or 3-ethyl-1,3,6-heptatriene provide vulcanizates having a good balance of physical properties which are particularly desirable in tire applications.

---

This invention relates to sulfur vulcanizable elastomers and relates more particularly to unsaturated polymers of one or more alpha olefins and at least one of 4-ethylidene-1,6-heptadiene and 3-ethyl-1,3,6-heptatriene.

I have found that 4-ethylidene-1,6-heptadiene and 3-ethyl-1,3,6-heptatriene polymerize readily with ethylene and propylene with a variety of reduced transition heavy metal catalyst to form homogeneous, essentially gel-free, interpolymers which are sulfur-vulcanizable at rates faster than presently known sulfur-vulcanizable interpolymers of ethylene and propylene and the resulting vulcanizates have an excellent balance of physical properties which makes such elastomers particularly desirable in tires.

It was surprising to find that 4-ethylidene-1,6-heptadiene provides gel-free interpolymers with alpha olefins since it contains two active polymerization sites. It was also quite surprising to find 3-ethyl-1,3,6-heptatriene polymerizing readily with ethylene and propylene with the usual catalyst employed in preparing such unsaturated interpolymers since this monomer contains conjugation and conjugated dienes generally complex with the reduced metal catalysts and deactivates such catalysts or at least results in very slow polymerization rates. Contrary to what would have been expected, these monomers polymerize readily with ethylene and propylene with reduced metal catalysts at useful rates to form essentially amorphous, homogeneous, linear interpolymers.

The elastomers are prepared with monoolefins containing 2 to 8 carbon atoms. It is usually preferred to prepare such rubbers from alpha-olefins containing 2 to 5 carbon atoms. Ethylene, propylene, butylene and mixtures thereof are particularly preferred. Such interpolymers contain less than about 80 mol percent ethylene and more preferably less than about 70 mol percent ethylene when high molecular weight amorphous elastomeric polymers are desired. When more than one monoolefin is employed, as propylene in conjunction with ethylene, the interpolymers will contain at least 20 mol percent propylene and usually from about 70 to 50 mol percent ethylene and 30 to 50 mol percent propylene.

The aliphatic triene content of the interpolymers will be varied from about 0.1 to 20 mol percent and more usually from about 0.2 to 5 mol percent. Excellent results are obtained with 0.5 to 2 mol percent in the interpolymers. Stated another way, the iodine number, representing olefinic unsaturation in the molecule will be varied from about 2 to 35, more preferably about 5 to 25. Either 4-ethylidene-1,6-heptadiene or 3-ethyl-1,3,6-heptatriene may be used or mixtures are suitably employed in preparing the unsaturated elastomers. The interpolymers of this invention will have dilute solution viscosities of from 0.5 to 5 as determined in 0.2% solutions of interpolymer in toluene at 25° C.

The elastomeric interpolymers are prepared by polymerizing the necessary monomers with catalysts which contain at least two essential components. The first component is a compound of a reducible transition heavy metal of groups IV, V, and VI of the Periodic Table, including particularly, titanium, zirconium, and vanadium, normally in the form of halides, oxyhalides and alcoholates. Such catalysts include $Ti(OR)_4$ wherein R is alkyl, $TiCl_4$, $VCl_4$, $VAc_3$, $VOCl_3$, vanadyl acetylacetonate and the like. The second component of the catalyst system are metals and compounds of groups I, II, and III of the Periodic Table, preferably lithium, sodium, magnesium, and aluminum, as the free metal, hydrides and organo-metallic compounds thereof. In the organo-metallic compounds, at least one valence bond should connect the metal with an organic radical. Such materials include lithium alkyls, aluminum trialkyls, aluminum dialkyl monohalides, aluminum monoalkyl dihalides, lithium hydride, aluminum hydride, aluminum alkyl hydrides, mixtures thereof, and the like. Preferred catalysts contain titanium tetrachloride or vanadyl oxychloride and alkyl aluminum halides, preferably the mono- and di-chlorides. The alkyl groups of the later component will contain from 2 to 8 and preferably from 2 to 4, carbon atoms. Normally the Group III metal compound will be present in molar excess in relation to the titanium or vanadium halide.

The polymerization reactions may be conducted in batch or continuous process and equipment. In batch reactions the monomers may be proportioned into the reactor during the run. As is known, the equipment and monomers employed must be essentially free of oxygen, water and other polar compounds when the monomers are polymerized with a metal alkyl reduced titanium or vanadium catalyst. Solvents may be used, if desired, and they are normally treated to remove oxygen and water. Useful solvents include the aromatic hydrocarbons such as benzene, toluene, and the like. Chlorinated hydrocarbons such as perchloroethylene have been found to be very useful. Aliphatic hydrocarbons such as heptane and hexane also are useful.

The temperature and pressure for the polymerization reaction may be varied quite widely. Temperatures of polymerization may be varied from any temperature above the freezing point of the polymerization mixture to a temperature just below the boiling point of the reaction mixture. Excellent results have been obtained in the range of about —20° C. to about 25° C. In the same manner, while satisfactory polymerizations have been obtained at atmospheric pressure or at pressures of only a few pounds, the polymerization may be carried out at very high pressures.

4 - ethylidene - 1,6 - heptadiene and 3 - ethyl - 1,3,6 - heptatriene are readily prepared by reacting together magnesium and allyl chloride with ethyl propionate to form 4-hydroxy-4-ethyl-1,6-heptadiene which is then dehydrated to form the desired trienes. The trienes are readily prepared by the procedure set forth below.

Example I

In this example the reactants employed and the amounts were 194 grams of magnesium, 612 grams of allyl chloride, 2500 grams of ethyl ether, and 408 grams ethyl propionate. The magnesium, 10 ml. of allyl chloride and 1250 grams of ether were placed in a 5 liter reactor equipped with a stirrer, dropping funnel, and condenser. After the reaction has been initiated, the remainder of the allyl chloride, ethyl propionate and ether were slowly added to the reactor to control the reaction rate. The reaction mixture was treated with ice and 400 ml. of sulfuric acid to hydrolyze the reaction product. The ether layer was removed and combined with three 200 ml. ether extracts of the water layer. Potassium carbonate was added to the ether solution to neutralize the acid and react with the water and the ether was evaporated on a steam bath. The potassium carbonate was filtered and the product was fractionated. The fraction boiling at 175° C. was collected. 404 grams of product was recovered which represented a yield of about 72.4% of 4-hydroxy-4-ethyl-1,6-heptadiene. One half of the 4-hydroxy-4-ethyl-1,6-heptadiene was placed in a reactor with 50 drops of phosphoric acid and distilled. The other half was then added to the reactor and the distillation continued. A yield of 32% of about an equal mol percent of mixture of 4-ethylidene-1,6-heptadiene and 3-ethyl-1,3,6-heptatriene was obtained. These two materials were readily separated by fractionation to provide high purity monomers for polymerization with alpha olefins.

Example II 400 ml. of dry perchloroethylene was placed in a stirred reactor with 1.3 ml. of a mixture of equal proportions of 4-ethylidene-1,6-heptadiene and 3-ethyl-1,3,6-heptatriene. Propylene was fed into the reactor while it was being cooled to 0° C. to saturate the perchloroethylene with propylene. 5 ml. of diethyl aluminum chloride in perchloroethylene (0.59 M) was added to the reactor and a mixture containing 25 mol percent ethylene and 75 mol percent propylene was started into the reactor and fed during the reaction at a rate such that the exit gas composition nearly equalled the feed composition. 3.9 ml. of $VOCl_3$ in perchloroethylene (0.1 M) was added and the reaction allowed to proceed with agitation for one hour at 0° C. Additional triene solution (6% in perchloroethylene) was added at the rate of 1 ml. at 2, 4, 7, 10, 15, 20, 30, 40 and 50 minutes. The reaction was stopped with ethanol and the polymers precipitated with ethanol and dried under vacuum. A yield of 16 grams of polymer was obtained. The essentially amorphous, homogeneous polymer had a dilute solution viscosity measured on a 0.2% solution in toluene at 25° C. of 2.66, only 1% gel, an iodine number of 6.6 and 61 mol percent ethylene determined by infra-red. This polymer was compounded to the following recipe.

| | Parts by weight |
|---|---|
| Polymer | 10 |
| ISAF black | 80 |
| Flexon 766 oil | 55 |
| Zinc oxide | 5 |
| Stearic acid | 1 |
| Tetramethylthiuram monosulfide | 1.5 |
| Mercaptobenzothiazole | 0.75 |
| Sulfur | 1.5 |

Samples cured for only 20 minutes at 320° F. had a 300% modulus of 750 p.s.i., tensile strength at break 3300 p.s.i., elongation of 640%, and A durometer of 59.

Example III

Example II was repeated with the exception that only 4-ethylidene-1,6-heptadiene was used as the triene. The resulting product had a dilute solution viscosity of 2.05, contained no gel, had an iodine number of 16. This polymer when compounded in a given sulfur masterbatch had a cure ratio determined in accordance with the procedure outlined in U.S. Patent 3,182,494 of 0.117.

Example IV

Example II was repeated with the exception that only 3-ethyl-1,3,6-heptatriene was used as the triene. The resulting product had an iodine number of 17.6. This polymer had an excellent cure rate.

Example V 2 ml. of an equimolar mixture of 4-ethylidene-1,6-heptadiene and 3-ethyl-1,3,6-heptatriene was charged with 200 ml. of dry, oxygen-free perchloroethylene to a reactor. The reactor was pressured to 6 p.s.i.g. with dry propylene and a 60/40 mol percent ethylene-propylene mixture was fed to the reactor at a pressure of about 10 pounds. 3 ml. of 0.59 molar diethyl aluminum chloride and 2 ml. of 0.2 molar $VOCl_3$, both in perchloroethylene, were charged separately to the reactor. The polymerization was conducted for one hour. The polymer was isolated with alcohol. The polymer had a dilute solution viscosity of 2.01, less than 1% gel, an iodine number of 20.1, and contained 1.4 mol percent of the trienes. The curometer ratio determined at a setting of 5 was 0.098 which indicates a polymer with excellent cure properties.

Example VI 400 ml. of dry perchloroethylene was placed in a stirred reactor with 1.6 ml. of a mixture of equal proportions of 4-ethylidene-1,6-heptadiene and 3-ethyl-1,3,6-heptatriene. Propylene was fed into the reactor while it was being cooled to 0° C. to saturate the perchloroethylene with propylene. 5.1 ml. of diethyl aluminum chloride in perchloroethylene (0.295 M) was added to the reactor and a mixture containing 25 mol percent ethylene and 75 mol percent propylene was started into the reactor and fed during the reaction at a rate such that the exit and inlet gas composition were about equal. 4.8 ml. of $VOCl_3$ in perchloroethylene (0.103 M) was added and the reaction allowed to proceed with agitation for one hour at 0° C. Additional triene solution (8% in perchloroethylene) was added at the rate of 1 ml. at 2, 4, 7, 10, 15, 20, 30, 40 and 50 minutes. The reaction was stopped with ethanol and the polymers precipitated with ethanol and dried under vacuum. A yield of 16.8 grams of polymer was obtained. The polymer had a dilute solution viscosity measured on a 0.2 percent solution in toluene at 25° C. of 2.29, no gel, an iodine number of 8.2 and 57 mol percent ethylene determined by infra-red. This polymer was compounded to the following recipe.

| | Parts by weight |
|---|---|
| Polymer | 10 |
| ISAF black | 80 |
| Flexon 766 oil | 55 |
| Zinc oxide | 5 |
| Stearic acid | 1 |
| Tetramethylthiuram monosulfide | 1.5 |
| Mercaptobenzothiazole | 0.75 |
| Sulfur | 1.5 |

Sample cured for 20 minutes at 320° F. had a 300% modulus of 1000 p.s.i., tensile strength at break 3400 p.s.i., elongation of 575, and A durometer value of 39.

I claim:
1. A sulfur-vulcanizable, essentially gel-free linear interpolymer of ethylene with 4-ethylidene-1,6-heptadiene and 3-ethyl-1,3,6-heptatriene in amounts of less than about 80 mol percent ethylene, at least about 20 mol percent propylene and 0.1 to 20 mol percent of 4-ethylidene-1,6-heptadiene and 3-ethyl-1,3,6-heptatriene in about equimolar proportions.

2. A sulfur-vulcanizable, essentially gel-free linear interpolymer of ethylene and propylene with 4-ethylidene-1,6-heptadiene and 3-ethyl-1,3,6-heptatariene at amounts of less than about 70 mol percent ethylene, about 30 to 50 mol percent propylene, from about 0.1 mol percent 4-ethylidene-1,6-heptadiene, together with 3-ethyl-1,3,6-heptatriene, in amounts to total about 0.5 to 5 mol percent.

3. A sulfur-vulcanizable, essentially gel-free linear interpolymer of ethylene and propylene with 4-ethylidene-1,6-heptadiene in amounts from about 60 to 70 mol percent ethylene, 30 to 40 mol percent propylene and 0.5 to 2 mol percent 4-ethylidene-1,6-heptadiene.

4. A sulfur-vulcanizable, essentially gel-free linear interpolymer of ethylene with 4-ethylidene-1,6-heptadiene in amounts of 0.1 to 20 mol percent of 4-ethylidene-1,6-heptadiene.

5. A sulfur-vulcanizable, essentially gel free linear interpolymer of ethylene, propylene and 4-ethylidene-1,6-heptadiene in amounts of less than about 70 mol percent ethylene, about 30–50 mol percent propylene and about 0.5 to 5 mol percent 4-ethylidene-1,6-heptadiene.

6. A sulfur-vulcanizable, essentially gel-free linear interpolymer containing 60 to 70 mol percent ethylene, 30 to 40 mol percent propylene, at least 0.1 mol percent of 4-ethylidene-1,6-heptadiene, and 3-ethyl-1,3,6-heptatriene in amounts whereby the iodine number of the interpolymer is from about 2 to about 35.

References Cited

UNITED STATES PATENTS 3,285,889  11/1966  Arnold _____ 260—80.78

FOREIGN PATENTS 636,945  12/1963  Belgium.

JOSEPH L. SCHOFER, Primary Examiner

R. S. BENJAMIN, Assistant Examiner

U.S. Cl. X.R.

260—80.78